United States Patent
Lacoche et al.

(10) Patent No.: US 11,510,029 B2
(45) Date of Patent: Nov. 22, 2022

(54) METHOD AND DEVICE FOR GUIDING AN INDIVIDUAL IN A CONNECTED ENVIRONMENT

(71) Applicant: Orange, Issy-les-Moulineaux (FR)

(72) Inventors: Jeremy Lacoche, Chatillon (FR); Anthony Foulonneau, Chatillon (FR); Eric Villain, Chatillon (FR); Fabrice Poirier, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 17/344,537

(22) Filed: Jun. 10, 2021

(65) Prior Publication Data
US 2021/0392456 A1 Dec. 16, 2021

(30) Foreign Application Priority Data
Jun. 10, 2020 (FR) ...................................... 2006075

(51) Int. Cl.
*H04W 4/02* (2018.01)
*H04W 4/024* (2018.01)

(52) U.S. Cl.
CPC .................................. *H04W 4/024* (2018.02)

(58) Field of Classification Search
CPC ....................................................... H04W 4/02
See application file for complete search history.

(56) References Cited

U.S. PATENT DOCUMENTS

| 10,412,811 B1* | 9/2019 | Siminoff ................ H05B 47/16 |
| 2010/0153003 A1 | 6/2010 | Merkel et al. |
| 2011/0022201 A1 | 1/2011 | Reumerman et al. |
| 2019/0020530 A1* | 1/2019 | Au .................... H04W 72/0413 |

FOREIGN PATENT DOCUMENTS

| DE | 10 2009 031019 A1 | 12/2010 |
| JP | 2011021971 | 2/2011 |
| WO | WO 96/39687 A1 | 12/1996 |
| WO | WO 2015/082717 A1 | 6/2015 |

OTHER PUBLICATIONS

French Search Report with Written Opinion for French Application No. 2006075, dated Jan. 26, 2021.

* cited by examiner

*Primary Examiner* — Michael T Vu
(74) *Attorney, Agent, or Firm* — Knobbe, Martens, Olson & Bear, LLP

(57) ABSTRACT

A method and a device for guiding an individual in an environment comprising at least one actuator capable of being remotely controlled is disclosed. The method is implemented by a computer, and comprises determining, based on a starting point and a destination point for the individual in the environment and based on a digital model of the environment comprising a location of each actuator, a path within the environment connecting the starting point and the destination point, determining, from the determined path, a set of actuators located on the path, and issuing of an activation command for at least one actuator in the set of actuators in order to guide the individual along the path.

13 Claims, 4 Drawing Sheets

METHOD AND DEVICE FOR GUIDING AN INDIVIDUAL IN A CONNECTED ENVIRONMENT

CROSS-REFERENCE TO RELATED APPLICATIONS

This application claims foreign priority to FR 2006075, filed Jun. 10, 2020. The contents of this application are incorporated by reference herein in its entirety.

BACKGROUND

Field

This application relates to a method and a device for guiding a person within an environment. The environment is typically a building, which can be of various types, for example a factory, an office building, a hospital, etc.

Description of the Related Technology

In environments of large size or complex geometry, it can be difficult for an individual to get his bearings and easily find his way. To guide him, maps are commonly made available which require the individual to locate himself on the map, locate his destination, and memorize a path leading him from his location to his destination. If the individual does not fully memorize the path, the individual must find another map and locate himself on the map once again.

Technological solutions have been proposed as improvements over the solution of maps located at fixed locations in the environment concerned. For example, it is known to display, on a telephone or a digital tablet, a map of the place on which is superimposed the path to follow, or a direction to follow to reach the destination. This is the case, for example, of document JP2011021971, which describes a method for guiding an individual in an indoor environment based on the communication between a mobile terminal of the individual and signaling devices arranged in the environment.

Augmented reality devices have also been proposed, such as augmented reality headsets, allowing information to be superimposed on the real world which allows following a path to the destination. The information may for example be virtual marking on the ground. Robots have also been proposed for guiding an individual to his destination.

All of these solutions have the disadvantage of requiring the use of special equipment, whether a telephone or other personal terminal, an augmented reality headset, or even a robot. It is therefore not possible to guide an individual if the individual or the location in question does not have this type of equipment, which can be expensive.

There is therefore a need for a solution for guiding inside an environment such as a building which does not require additional equipment.

SUMMARY OF CERTAIN INVENTIVE ASPECTS

For this purpose, a method is described herein for guiding an individual in an environment comprising at least one actuator capable of being remotely controlled and a set of presence sensors for detecting the presence of an individual that are capable of transmitting data remotely, the sensors being capable of detecting the presence of an individual with no voluntary action by the individual to signal his presence, the method being implemented by a computer, and comprising:

the determination, based on a current point among an initial point and a point corresponding to a position for the individual in the environment that is estimated on the basis of the sensors, and a destination point for the individual in the environment, and a digital model of the environment comprising the location of each actuator, of a path within the environment connecting the current point and the destination point, from the determined path, the determination of a set of actuators located on the path, and the issuing of an activation command for at least one actuator in the set in order to guide the individual along the path.

In some embodiments, the determined path is the shortest route between the starting point and the ending point.

In some embodiments, the determination of the set of actuators located on the path may comprise the implementation, for each actuator of the environment, of:

an identification of the closest point of the path to the actuator, the implementation, in the model of the environmental, of ray tracing between the actuator and the closest point of the path, and, the addition of the actuator to the set if no obstacle is present between the actuator and the closest point of the path.

In some embodiments, the determination of the actuators located on the path further comprises the calculation of a distance between each actuator in the environment and the closest point of the path, and the addition of the actuator to the set if the distance is less than a predetermined threshold.

In some embodiments, the method further comprises, before the issuing of the activation command, a selection of at least one actuator to be controlled, among the set of actuators located on the path, as a function of an estimate of the position of the individual.

In some embodiments, the selection of an actuator to be controlled can comprise:

the receiving of presence information about the presence of the individual in the environment, acquired by at least one presence sensor, the determination, from the presence information received, of an estimate of the position of the individual in the environment, the selection of at least one actuator located on the path, between the estimated position of the individual and the destination point.

In embodiments, the method further comprises the estimation of a position of the individual in the environment on the basis of data acquired by the sensors and, if the individual is outside the calculated path, the calculation of a new path between the estimated position of the individual and the destination point.

In some embodiments, the method may comprise the guiding of multiple individuals simultaneously, and the generation of a different actuator activation command for each individual to be guided.

According to another object, a guiding device is described for guiding an individual in an environment comprising at least one actuator capable of being remotely controlled, and a set of presence sensors for detecting the presence of an individual, capable of transmitting data remotely, the sensors being capable of detecting the presence of an individual with no voluntary action by the individual to signal his presence, the guiding device comprising at least one computer, and being characterized in that it is configured to implement the method according to the above description.

In some embodiments, the guiding device may further comprise a memory storing the digital model of the environment.

Another object relates to a computer program product, comprising code instructions for implementing one of the methods described above when it is executed by a computer.

Finally, a guiding system for guiding an individual in an environment is described, comprising:
- at least one actuator located in the environment and able to be remotely controlled,
- at least one presence sensor for detecting the presence of an individual, capable of detecting the presence of the individual with no voluntary action by the individual to signal his presence, and capable of transmitting data remotely, and
- a guiding device according to the above description.

In some embodiments, the guiding system may further comprise a device for managing actuators comprising at least one computer, a memory storing a digital model of the environment and the location of each actuator, and a communication interface for remote communication with each actuator, the device for managing actuators being suitable for:
- sending to the guiding device at least part of the digital model of the environment and locations of actuators located in the environment,
- receiving, from the guiding device, an activation command for at least one actuator, and
- activating at least one actuator in accordance with the command received.

In some embodiments, the actuator of the guiding system may be capable of emitting visible or audible information when activated.

In some embodiments, the guiding system may further comprise a human-machine interface capable of receiving from an individual his position within the environment and of communicating said position to the guiding device.

The proposed guiding method makes it possible to take advantage of the many actuators that are already normally found in many buildings or other sites, in order to guide individuals without requiring additional equipment. Indeed, the actuators in place at the site are controlled to guide the individual on his path to his destination.

As a result, the guiding method is inexpensive because it does not require additional equipment, and is easily accessed by all individuals since it does not require the individual to make use of a specific device.

In addition, as many places are also already equipped with connected sensors, it is also possible to take advantage of these sensors, regardless of their type (position sensor, motion sensor, camera, etc.), to determine the progress of the individual along his path, and to control only the actuators located in proximity to the individual or remaining on what remains of his path. It is thus possible to take advantage of the sensors and actuators present in the environment, even if these sensors or actuators are of varied technologies, to ensure the guiding of the individual, without having to modify the systems in the environment in order to comply with a single technology.

The use of environmental sensors also makes it possible to recalculate the path in order to be able to provide dynamic guiding of the individual throughout his progress, which makes it possible to avoid guiding errors and to assure the individual that he will reach the desired destination.

The act of calculating a path according to the digital model of the building allows automating the determination of the path while reducing the use of computing resources and memory requirements. Indeed, it is not necessary to calculate in advance all possible paths within the environment and to associate with each path the actuators present along this path. If the geometry of the environment changes, it is also easier to calculate new paths since it is sufficient to modify the digital model of the building, not recalculate a list of possible paths within the modified environment.

BRIEF DESCRIPTION OF THE DRAWINGS

Other features, details and advantages will be apparent from reading the detailed description below, and from analyzing the accompanying drawings, in which.

DETAILED DESCRIPTION OF CERTAIN ILLUSTRATIVE EMBODIMENTS

We will now describe a method for guiding an individual in an environment. This environment may be a building or a set of buildings, possibly also including exterior spaces, for example such as a factory, an office building, a hospital complex, a shopping center, an amusement park, a school or school campus, etc.

Figure 2:
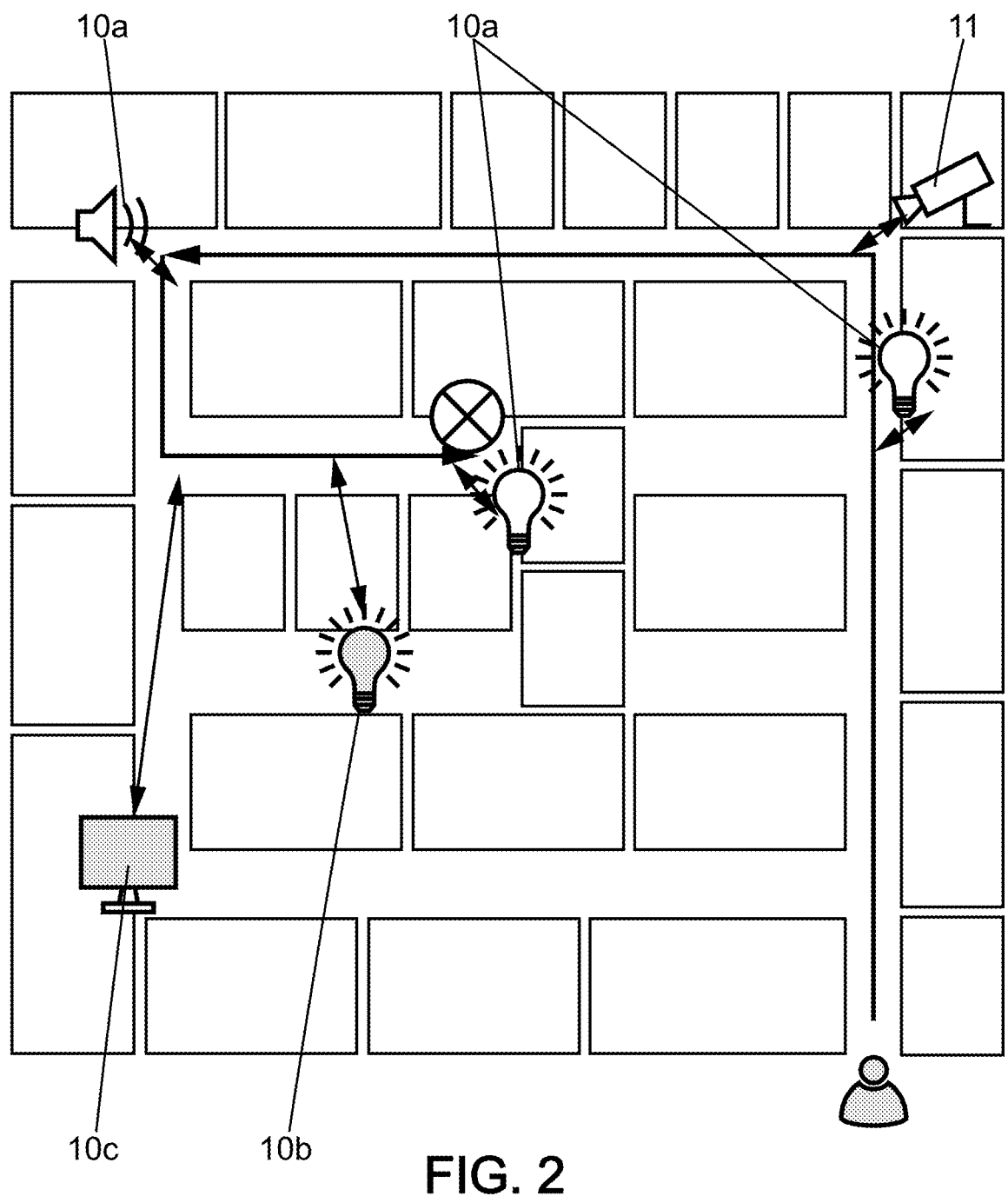
FIG. 2 shows an example of a path in a building and of the selection of controllable actuators and/or sensors along this path.

Referring to FIG. 2, the environment comprises at least one and preferably a plurality of actuators 10, each actuator being capable of being remotely controlled. In one embodiment, each actuator is said to be "connected", meaning it comprises a communication interface for remote communication, the communication interface being capable of connecting the actuator to a wireless communication network, such as a low power wireless network or LPWAN or any other wireless network such as a mobile network among GSM, UMTS, LTE, 3G, 4G, 5G, etc. Each actuator further comprises control electronics comprising at least one computer 13 for example a microprocessor, a processor, a microcontroller, an FPGA, etc.—and a memory.

The actuators 10 may be capable of emitting audio or visual information when they are activated. According to one non-limiting example, an actuator may be a lighting device (lamp, spotlight, marking lights or a projector of information on the ground, ceiling, or wall, signage screen, etc.), which can be ordered to turn on, possibly in one or more particular colors, to flash, to display a particular message, etc., in order to guide the individual to his destination. An actuator may also be an audio device such as a loudspeaker, and be controlled to emit a voice message, music, one or more determined sounds, which also make it possible to guide an individual to his destination.

In one embodiment, the environment also comprises at least one and preferably a plurality of sensors 11, each sensor being able to transmit data remotely. In one embodiment, each sensor is said to be "connected", and comprises a communication interface for remote communication (not shown), the communication interface being capable of connecting the sensor to a wireless communication network, such as a low power wireless network or LPWAN or any other wireless network such as a mobile network among GSM, UMTS, LTE, 3D, 4G, 5G, etc. Each sensor further comprises control electronics comprising at least one computer, for example a microprocessor, a processor, a microcontroller, an FPGA, etc., and a memory.

The sensors 11 are capable of detecting the presence of an individual in order to allow locating the individual, or at least estimating his location, from the information acquired by the sensor. Thus, according to some non-limiting examples, the sensor may be a camera, a motion detector, a door-opening sensor, a ground pressure sensor, a switch that can be actuated to turn on a light or open a door, a heat sensor, etc. The sensors 11 are therefore suitable for detecting the presence of an individual with no voluntary action by the individual to signal his presence to the sensor.

Figure 1:
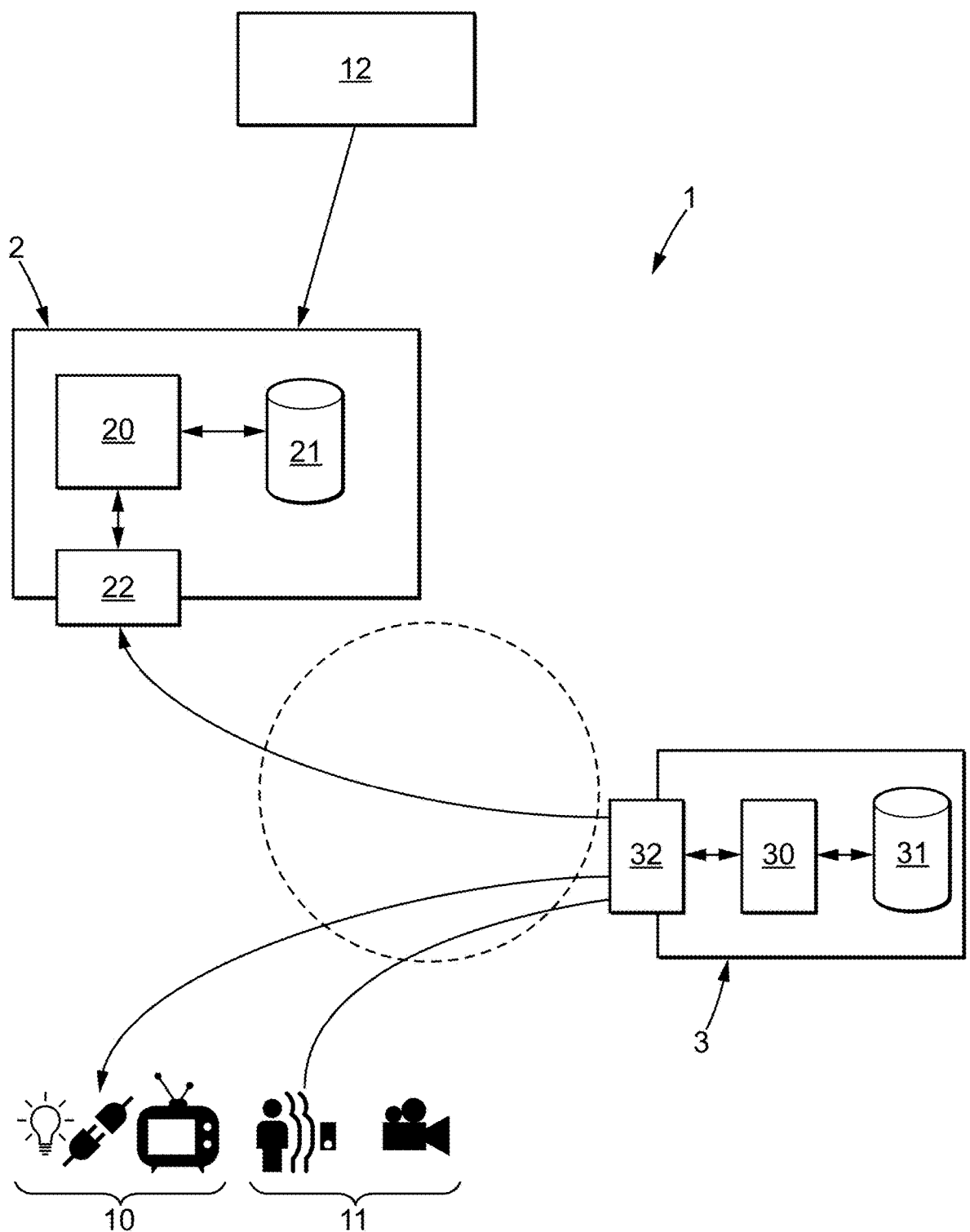
FIG. 1 shows a guiding system according to one embodiment.

With reference to FIG. 1, the method for guiding the individual in the environment is implemented by a guiding device 2 comprising at least one computer 20, for example a processor, a microprocessor, a controller, a microcontroller, etc., and a memory 21 storing code instructions for implementing the guiding method. The guiding device 2 also comprises an interface 22 for connecting to a communication network such as a mobile network among GSM, UMTS, LTE, 3G, 4G, 5G, or a low power network, this interface therefore making it possible to communicate remotely with the actuators and the sensors if sensors are used for guiding.

In one embodiment, the guiding device is capable of communicating remotely with the actuators 10 and sensors 11 in order to receive data acquired by the sensors and to issue actuator activation commands. In one embodiment, the retrieval of data from the sensors and the activation of the actuators is performed by the guiding device. In a variant shown in FIG. 1, these tasks are performed by a server 3 dedicated to managing these actuators and sensors 11, and the server is capable of communicating with the guiding device to transmit the data acquired by the sensors and/or to receive actuator activation commands from the guiding device. The server 3 may comprise a computer 30 of the type described above, a memory 31, and an interface 32 for connecting to a telecommunications network as set forth above.

As described in more detail below, the guiding of the individual is performed based on a three-dimensional digital representation of the environment, also called a digital twin, also comprising the location of each actuator 10 and, if there are any, of each sensor 11. This digital twin may be stored in the memory 22 of the guiding device, or alternatively in a memory 31 of the server 3 managing the actuators and sensors, or may be stored in another terminal of the communication network to which the guiding device is connected, such that the guiding device can access it.

In one embodiment, this digital twin of the environment comprises a three-dimensional reproduction of the geometry of the environment, which may be a mesh or a cloud of points, and a graph of the "navigable" areas of the environment, meaning those which correspond to areas of the environment where an individual can be, as opposed to "non-navigable" areas which correspond for example to walls or areas not accessible to the individual. The graph of the navigable areas of the environment is obtained based on the geometry of the environment, by identifying the flat and/or obstacle-free zones within it. In one embodiment, the graph of navigable areas can be obtained by Delaunay triangulation applied to the mesh representing the geometry of the environment. We thus obtain all the "navigable" zones of the environment. For more details on implementation, refer to the publication by F. Lamarche: "TopoPlan: a topological path planner for real time human navigation under floor and ceiling constraints", HAL Id: inria-00432184.

Figure 3:
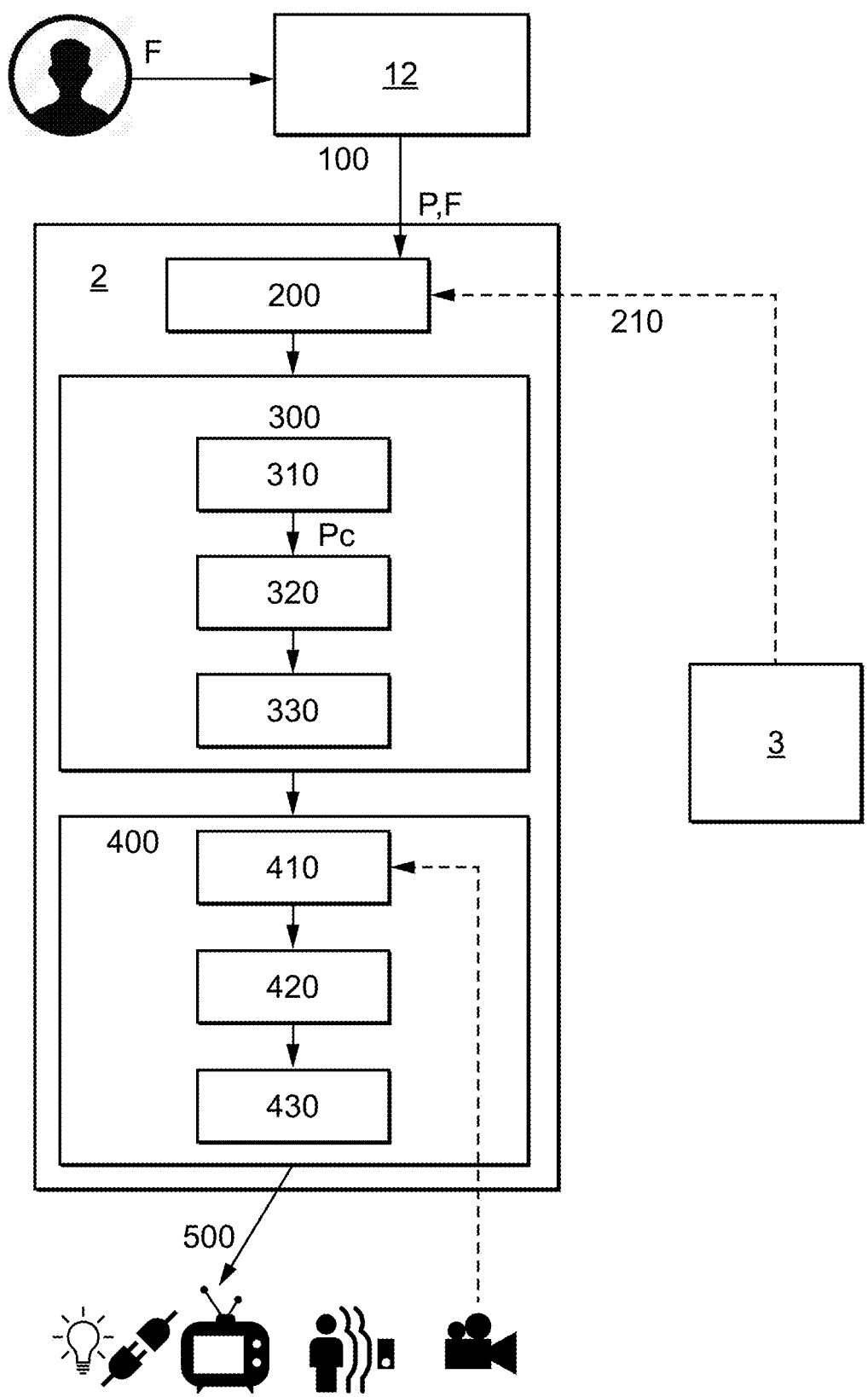
FIG. 3 schematically represents the main steps of the guiding method according to one embodiment.

FIG. 3 schematically represents the principles of a guiding method implemented by the guiding device. This method comprises the receiving 100, by the guiding device, of a starting point and a destination point for the individual within the environment under consideration.

In one embodiment, the environment may comprise at least one Human Machine Interface 12, suitable for communicating with the guiding device, the interface allowing an individual to indicate the destination point F where he wishes to go. If this Human Machine Interface 12 is fixed, the location of the interface can constitute the starting point for the individual D. For example, a Human Machine Interface 12 can be located at Reception or at a point of entry into the environment.

Once the starting point and destination point are received, during a step 200 the guiding device determines a path within the environment connecting the starting point to the destination point. This determination is made based on the digital twin of the environment, which the guiding device accesses or retrieves in order to implement this step. In the case where the digital twin is stored in a memory of the server managing the actuators and sensors, this server can send (210) at least part of the digital twin, including the positions of the actuators and where appropriate of the sensors, to the guiding device.

In one embodiment, the path calculated by the guiding device is the shortest path between the starting point and the destination point. In the case where the digital model of the environment comprises a graph of the navigable zones of the environment, one possible implementation of this step is the A* algorithm, which traverses the graph of navigable cells by starting from the starting cell until reaching the destination cell, and which is described in the publication by P. Hart et al. "A Formal Basis for the Heuristic Determination of Minimum Cost Paths".

Returning to FIG. 2, the method then comprises the determination 300, based on the determined path, of a set of actuators 10a located on the path. These actuators 10a are preferably determined such that the individual following the path can see or hear these actuators, meaning that the actuators close to the identified path are determined.

To do so, in one embodiment, the determination 300 of the set of actuators located on the path comprises, for each actuator 10 located in the environment and which can be remotely controlled, an identification 310 of the point of the path closest $P_c$ to the actuator.

In one non-limiting exemplary embodiment, by denoting the position of the actuator as $P_a$ and the position on the path closest to $P_a$ as $P_c$, and by considering the route as a set of segments $[A_i, B_i]$, the point on the path closest to the actuator is determined by calculating the projection of point $P_a$ onto each segment $[A_i, B_i]$, denoted $P_{ai}$, by:

$$P_{ai} = A_i + \overrightarrow{A_i B_i} \times \frac{\overrightarrow{A_i P_a} \cdot \overrightarrow{A_i B_i}}{\overrightarrow{A_i B_i} \cdot \overrightarrow{A_i B_i}}$$

and $P_c$ is chosen as being the value of $P_{ai}$ which minimizes $[P_a, P_{ai}]$.

Once the point on the path closest to the actuator has been determined, ray tracing is implemented 320 in the reproduction of the geometry of the environment, from the actuator and towards the closest point on the path, to determine if an obstacle is located in the model of the environment between the actuator and the closest point on the path. The ray thus generated therefore extends from the position of the actuator in a direction defined by $\overrightarrow{P_aP_c}$.

If no obstacle is present between the actuator and the closest point on the path, then the actuator 10 is added 330 to the set of actuators 10a considered to be on the path. In FIG. 3, we have represented the actuators 10a identified as being on the path and the actuators 10b identified as not being on the path because there is an obstacle between the actuator and the closest point on the path.

In one embodiment, an actuator must also be at a distance from the path, meaning at a distance from the closest point on the path to the actuator, that is less than a determined threshold, in order to be added to the list of actuators considered to be on the path. In FIG. 2, for example, the case of a screen 10c too far from the path has been represented.

Once the set of actuators located on the path has been determined, the method comprises the issuing 500 of an activation command for at least one of these actuators, to guide the individual along the path and to his destination. In one embodiment, the activation command is generated for all the actuators, which makes it possible to mark the path to be followed within the environment regardless of the user's position.

Alternatively, and in particular in the case where the environment further comprises sensors 11, the activation command may be generated only for a subset of actuators which are previously selected on the basis of the position, or an estimate of the position, of the individual in the environment.

In this case, a selection 400 of the actuators to be activated may comprise the receiving 410 of at least one piece of information about the presence of an individual, acquired by a sensor, and the determination 420, from the received presence information, of an estimate of the individual's position in the environment. In particular, the position and type of the sensor give an indication of the position of the individual at the time his presence is detected by the sensor. In the case where there is a time interval between this time and the time when the presence information is received by the guiding device, the time interval can be processed to deduce an estimate of his current position, for example based on an average speed of an individual who is walking.

Based on the estimated position of the individual, the guiding device can select 430 a subset of actuators located between the estimated position of the individual and his destination point. Alternatively, the guiding device may select 430 only a subset of actuators, among the actuators located on the path, that are located at a distance below a first threshold. In other words, this makes it possible to guide an individual as he travels the path. In this case, the guiding device can issue a switch-off command, or a modified activation command, for the actuators that the individual has already passed, in order to reduce the energy consumed by the actuators and/or to enable subsequent reactivation of the actuators for another person.

In one embodiment, an actuator may not be selected, although located between the estimated position of the individual and his destination point, if it is at a distance from the position of the individual that is less than a second determined threshold, smaller than the first. Indeed, the sudden activation of an actuator located in the immediate vicinity of an individual is undesirable because this may surprise or frighten the individual.

If several individuals need to be guided simultaneously within the environment, the guiding device is advantageously capable of generating different activation commands for at least some actuators for each individual, meaning that the same actuator is not activated in the same manner for two different individuals. This makes it possible to provide personalized guidance for each individual, to prevent one individual from following the path of another individual. For example, actuators may be formed by strips of LEDs of different colors, and the activation command of the guiding device concerns a different color for each individual, which will have been communicated to that individual. Alternatively, loudspeakers can emit a message specific to an individual, and in the case where the same loudspeaker is activated for several individuals, it can be controlled to successively emit messages specific to each individual.

The result is that once an individual has specified his starting point and his destination point, he only has to follow the indications of the actuators, for example a path of lights, to reach his destination.

Figure 4:
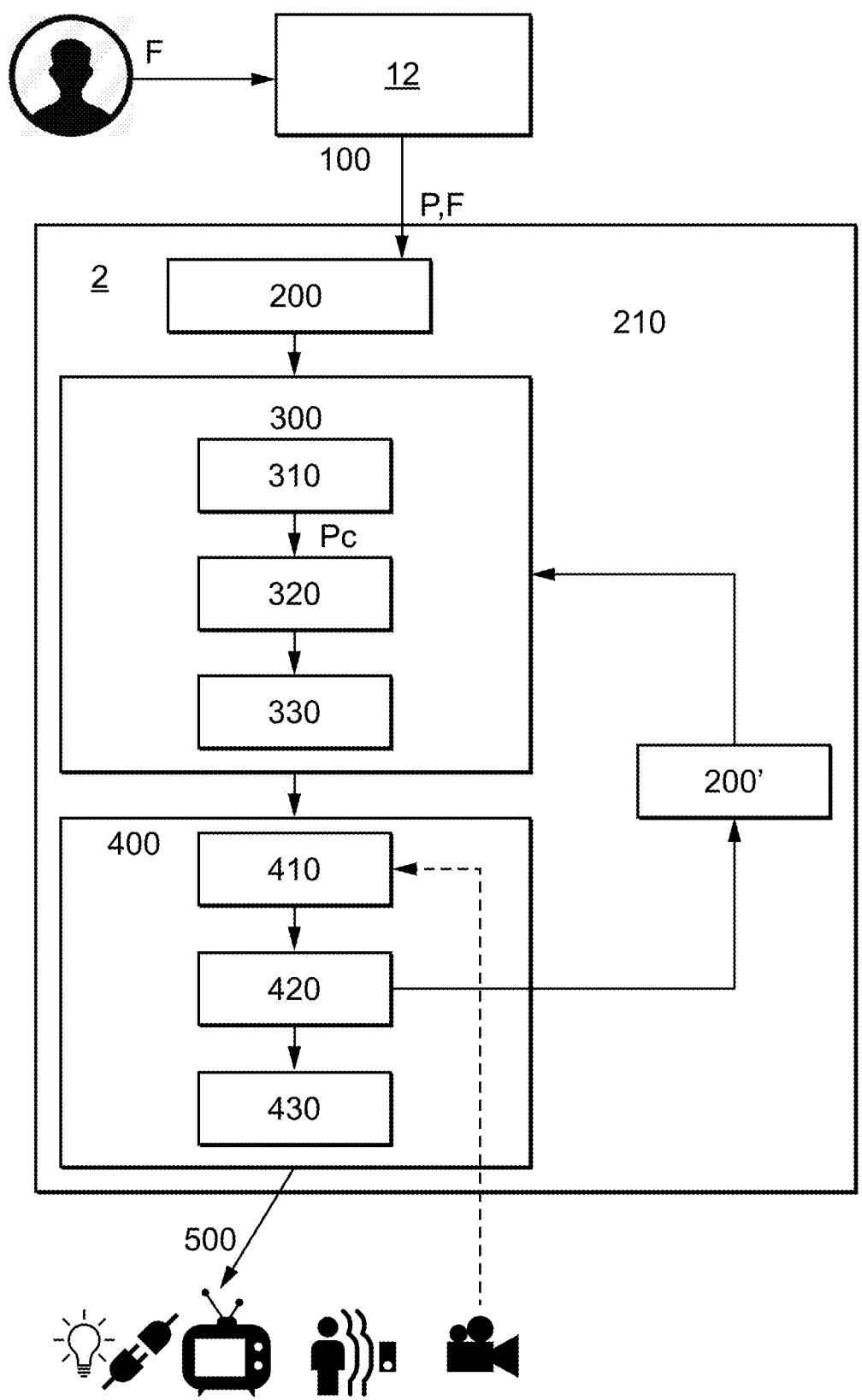
FIG. 4 schematically represents the main steps of the guiding method according to another embodiment.

With reference to FIG. 4, when the environment comprises a set of presence sensors 11 for detecting the presence of the individual as described above, the presence information acquired by the sensors can be used to implement a dynamic guiding of the individual within the environment. This dynamic guiding comprises the calculation 200' of an update to the path of the individual, between a point which corresponds to an estimate of the position of the individual in the environment, obtained from the measurements of the sensors, and the destination point. This calculation of the new path is implemented in the same way as the calculation of the initial path described in step 200 above, meaning on the basis of the digital model of the environment.

Once the path has been recalculated, steps 300 to 500 described above are also applicable.

This dynamic guiding is particularly advantageous in the case where the information acquired by the presence sensors allows detecting that the individual is not on the calculated initial path. It is thus possible to recalculate a path to bring him back towards the destination, and thus prevents the individual from becoming lost.

Thus in the exemplary embodiment shown in FIG. 4, the method comprises: the calculation 200 of an initial path between a starting point of the individual and the destination point, the determination 300 of a set of actuators located on the path which are to be activated, and the issuing 500 of an activation command for the actuators. The method also comprises, during the progress of the individual through the environment: the receiving 410 of information about the presence of the individual in the environment based on measurements of the sensors, the estimation 420 of a position of the individual in the environment based on said information and, if the estimated position is not on the initial path, the calculation 200' of a new path between the estimated position and the destination, and the implementation of steps 300, 500, and where applicable 400 with this new path.

In this variant also, and although it is not shown, the system implementing the guiding may comprise a guiding device 2 calculating the path and issuing an activation command for the actuators located on the path, and a device 3 for managing the actuators which activates the actuators in accordance with this command.

The invention claimed is:

1. A guiding method of guiding an individual in an environment comprising at least one actuator capable of being remotely controlled and a set of presence sensors for detecting the presence of an individual that is capable of transmitting data remotely, the sensors being capable of detecting the presence of an individual with no voluntary action by the individual to signal the individual's presence, the method being implemented by a computer, and comprising:
- determining, based on a current point among a starting point and a position for the individual in the environment that is estimated on the basis of the sensors, and a destination point for the individual in the environment, and a digital model of the environment comprising a location of each actuator, a path within the environment connecting the current point and the destination point;
- from the determined path, determining a set of actuators located on the path; and
- issuing of an activation command for at least one actuator in the set of actuators to guide the individual along the path.

2. The method of claim 1, wherein the determining the set of actuators located on the path comprises implementing, for each actuator of the environment, of:
- identifying a closest point of the path to the actuator;
- implementing, in the model of the environment, ray tracing between the actuator and the closest point of the path; and
- adding the actuator to the set if no obstacle is present between the actuator and the closest point of the path.

3. The method of claim 2, wherein the determining the set of actuators located on the path further comprises calculating a distance between each actuator in the environment and the closest point of the path, and adding the actuator to the set of actuators if the distance is less than a predetermined threshold.

4. The method of claim 1, further comprising, before the issuing of the activation command, selecting at least one actuator to be controlled, among the set of actuators located on the path, as a function of an estimate of the position of the individual.

5. The method of claim 4, wherein the selecting at least one actuator to be controlled comprises:
- receiving of presence information about the presence of the individual in the environment, acquired by at least one presence sensor;
- determining, from the presence information received, an estimate of the position of the individual in the environment; and
- selecting at least one actuator located on the path, between the estimated position of the individual and the destination point.

6. The method of claim 1, further comprising estimating a position of the individual in the environment on the basis of data acquired by the sensors and, if the individual is outside the determined path, calculating a new path between the estimated position of the individual and the destination point.

7. The method of claim 1, comprising guiding of several individuals simultaneously, and generating a different actuator activation command for each individual to be guided.

8. A guiding device for guiding an individual in an environment comprising at least one actuator capable of being remotely controlled, and a set of presence sensors for detecting a presence of an individual that are capable of transmitting data remotely, the sensors being capable of detecting the presence of an individual with no voluntary action by the individual to signal the individual's presence, the guiding device comprising at least one computer, and wherein the guiding device is configured to implement the method of claim 1.

9. The guiding device of claim 8, further comprising a memory storing the digital model of the environment.

10. A non-transitory computer-readable storage medium comprising a computer program stored thereon comprising code instructions for implementing the method of claim 1, when the code instructions are executed by a computer.

11. A guiding system for guiding an individual in an environment, the guiding system comprising:
- at least one actuator located in the environment, and able to be remotely controlled;
- at least one presence sensor for detecting a presence of an individual, capable of detecting the presence of the individual with no voluntary action by the individual to signal the individual's presence, and capable of transmitting data remotely; and
- a guiding device of claim 8.

12. The guiding system for guiding an individual of claim 11, further comprising a device for managing actuators comprising at least one computer, a memory storing a digital model of the environment and a location of each actuator, and a communication interface for remote communication with each actuator, the device for managing actuators being suitable for:
- sending to the guiding device at least part of the digital model of the environment and locations of actuators located in the environment;
- receiving, from the guiding device, an activation command for at least one actuator, and
- activating the at least one actuator in accordance with the command received.

13. The guiding system for guiding an individual of claim 11, wherein the at least one actuator is capable of emitting visible or audible information when activated.

* * * * *